United States Patent
Ress, Jr. et al.

(10) Patent No.: US 6,916,550 B2
(45) Date of Patent: Jul. 12, 2005

(54) METHOD OF MANUFACTURING A METAL MATRIX COMPOSITE STRUCTURE

(75) Inventors: Robert A. Ress, Jr., Carmel, IN (US); Jason E. Dundas, Indianapolis, IN (US); Preston E. Light, Fishers, IN (US); Brian P. King, Greenwood, IN (US)

(73) Assignee: Allison Advanced Development Company, Indianapolis, IN (US)

( * ) Notice: Subject to any disclaimer, the term of this patent is extended or adjusted under 35 U.S.C. 154(b) by 0 days.

(21) Appl. No.: 09/951,929

(22) Filed: Sep. 11, 2001

(65) Prior Publication Data

US 2002/0031678 A1 Mar. 14, 2002

Related U.S. Application Data

(60) Provisional application No. 60/231,615, filed on Sep. 11, 2000, and provisional application No. 60/231,616, filed on Sep. 11, 2000.

(51) Int. Cl.⁷ .............................. B32B 3/30; B32B 5/24; B32B 15/14; B26D 3/06; B23C 3/32
(52) U.S. Cl. ................. 428/600; 428/606; 428/608; 428/293.1; 83/875; 228/190
(58) Field of Search .................. 428/600, 608, 428/611, 614, 293.1; 83/875; 228/165, 170, 190

(56) References Cited

U.S. PATENT DOCUMENTS

| | | | |
|---|---|---|---|
| 2,961,762 A | | 11/1960 | Clark et al. |
| 3,419,952 A | * | 1/1969 | Carlson ................... 228/164 |
| 3,555,950 A | | 1/1971 | Gijsbers et al. .............. 83/171 |
| 3,737,976 A | * | 6/1973 | Lieberman et al. ......... 228/109 |
| 3,770,488 A | | 11/1973 | Pepper et al. |
| 3,790,744 A | | 2/1974 | Bowen ................ 219/121 LM |
| 3,909,582 A | | 9/1975 | Bowen ................ 219/121 LM |
| 4,116,503 A | * | 9/1978 | Licht ......................... 384/124 |
| 4,217,157 A | | 8/1980 | Stoltze et al. |
| 4,342,349 A | | 8/1982 | Lipman |
| 4,439,812 A | | 3/1984 | Chapman ................... 361/314 |
| 4,447,286 A | | 5/1984 | Weglin ......................... 156/15 |
| 4,499,801 A | | 2/1985 | Reba et al. |
| 4,697,324 A | | 10/1987 | Grant et al. ............. 29/419 R |
| 4,762,268 A | | 8/1988 | Doble .................... 228/186 L |
| 4,900,599 A | | 2/1990 | Doble ......................... 428/65 |
| 4,912,844 A | | 4/1990 | Parker ......................... 29/848 |
| 5,102,744 A | | 4/1992 | Wirz et al. .................. 428/600 |
| 5,152,060 A | * | 10/1992 | Schubert et al. ....... 29/890.039 |
| 5,184,769 A | | 2/1993 | Moracz et al. ............. 228/121 |
| 5,249,359 A | | 10/1993 | Schubert et al. ....... 29/890.039 |
| 5,295,937 A | | 3/1994 | Katoh et al. |
| 5,312,695 A | * | 5/1994 | Siemers et al. ............. 428/614 |
| 5,322,740 A | * | 6/1994 | Ghosh ........................ 428/649 |
| 5,337,940 A | | 8/1994 | Woods et al. ............... 228/190 |
| 5,398,580 A | | 3/1995 | Gerhardt et al. ............. 83/880 |
| 5,421,938 A | | 6/1995 | Cunningham, Jr. |
| 5,427,304 A | | 6/1995 | Woods et al. ............... 228/190 |
| 5,431,984 A | | 7/1995 | Keck et al. ................. 428/175 |
| 5,449,482 A | | 9/1995 | Faddar et al. ............... 264/154 |
| 5,504,992 A | | 4/1996 | Fukutomi et al. ............ 29/847 |
| 5,515,758 A | | 5/1996 | Bechmann ................... 83/880 |
| 5,575,598 A | | 11/1996 | Abe et al. |
| 5,578,148 A | | 11/1996 | Eylon et al. ................ 148/527 |
| 5,840,390 A | | 11/1998 | Fujiwara ...................... 428/37 |
| 5,851,737 A | | 12/1998 | Maruyama |
| 5,928,767 A | | 7/1999 | Gebhardt et al. ........... 428/209 |
| 5,932,050 A | | 8/1999 | Ikeda et al. |
| 6,082,891 A | * | 7/2000 | Schubert et al. ............ 366/338 |
| 6,117,062 A | | 9/2000 | Alhamad .................... 493/363 |
| 6,305,834 B1 | * | 10/2001 | Schubert et al. ............ 366/144 |

FOREIGN PATENT DOCUMENTS

JP          57-205003     * 12/1982

* cited by examiner

*Primary Examiner*—John J. Zimmerman
(74) *Attorney, Agent, or Firm*—Barnes & Thornburg (57) ABSTRACT

A method for mechanically cutting a continuous circular shaped groove in a foil sheet for use in a metal matrix composite product. In one form the foil sheet is held adjacent a rotating machine tool by vacuum and a cutting tool is moved relative thereto to cut a spiral groove.

22 Claims, 9 Drawing Sheets

METHOD OF MANUFACTURING A METAL MATRIX COMPOSITE STRUCTURE

CROSS-REFERENCE TO RELATED APPLICATIONS

This application claims the benefit of United States Provisional Patent Applications No. 60/231,615 entitled Mechanically Grooved Sheet and Method of Manufacture and Ser. No. 60/231,616 entitled Method of Manufacturing a Metal Matrix Composite Structure. The above Provisional Patent Applications were filed on Sep. 11, 2000 and are incorporated herein by reference. This application is related to concurrently filed U.S. patent application Ser. No. 09/951,933 entitled Mechanically Grooved Sheet and Method of Manufacture, now abandoned.

BACKGROUND OF THE INVENTION

The present invention relates generally to a process for producing a grooved foil material that is utilized in the production of a Metal Matrix Composite (MMC) sheet product. In one form, the process produces a MMC sheet product having a continuous spiral groove. More particularly, the present invention relates to a method of making a grooved foil sheet material that is utilized in fabricating an internally reinforced metal matrix composite ring. Although the present invention was developed for use in gas turbine engines, certain applications may be outside this field.

Many metal matrix composite structures have been designed to provide the required mechanical properties to operate in a hostile environment. Metal matrix composite structures can be fabricated by a number of techniques including foil-fiber-foil, coated fiber, ribbon wound fiber and wire-fiber. The matrix alloy chosen to form the MMC structure generally determines which of the above fabrication techniques is feasible. For example, a Ti-6-4 MMC structure can wire-fiber. The matrix alloy chosen to form the MMC structure generally determines which of the above fabrication techniques is feasible. For example, a Ti-6-4 MMC structure can generally be fabricated by using any of the above described techniques since the material Ti-6-4 is available in foil, powder, ribbon, and wire form. In contrast, certain high temperature titanium alloys such as Ti-22Al-26Nb (orthorhombic titanium) are only available in a sheet or powder form. Therefore high temperature titanium and titanium-aluminide alloy MMC structures are generally fabricated by the foil-fiber-foil method.

When fabricating MMC structures with the foil-fiber-foil technique, it is often desirable to utilize grooved foil. A continuous high strength monofilament is laid in the grooved foil and multiple loaded foils are stacked and consolidated to form the structure. The grooving provides a uniform fiber to fiber spacing in the consolidated structure. It is known that grooved foil has successfully been used in producing MMC structures formed of a conventional titanium matrix. One prior technique of producing grooved foil of a conventional titanium material has employed a photolithographic etching technique. However, these photolithographic techniques have proven unsuccessful in producing well-defined grooves in high temperature titanium aluminide alloys such as Ti-22Al-26Nb.

The present invention allows for the production of a grooved foil sheet product in a novel and nonobvious way.

SUMMARY OF THE INVENTION

One form of the present invention contemplates a method, comprising: providing a machine tool having a backing surface; positioning a sheet of foil adjacent the backing surface; securing the sheet of foil to the machine tool; and, cutting at least one continuous circular shaped groove in the sheet of foil with a cutting tool.

Another form of the present invention contemplates a method, comprising: providing a machine tool having a backing surface; positioning a sheet of foil adjacent the backing surface; drawing the sheet of foil against the backing surface with a vacuum; mechanically coupling the sheet of foil to the machine tool; and cutting at least one continuous groove through a three hundred and sixty degree revolution in the sheet of foil with a cutting tool.

Another form of the present invention contemplates a method, comprising: positioning a sheet of orthorhombic titanium foil on a surface of a machine tool; holding the sheet of orthorhombic titanium foil against the surface of the machine tool with one of a vacuum and adhesive; mechanically securing the sheet of orthorhombic titanium foil with the surface of the machine tool; rotating the surface of the machine tool; orienting a single point cutting tool with respect to the orthorhombic titanium foil sheet; and, cutting at least one continuous circular shaped groove on a side of the orthorhombic titanium foil sheet with the cutting tool, wherein a starting point of said cutting is radially inward on the sheet with respect to an ending point of said cutting.

Yet another form of the present invention contemplates a composite preform, comprising: a foil member having thickness less than about 0.010 inches and at least one continuous circular shaped groove cut therein that is consistent with the mechanical removal of material with a cutting tool, and wherein the circular shaped groove having a width less than about 0.008 inches and a depth less than about 0.004 inches.

One object of the present invention is to provide a unique method for producing grooved foil.

Related objects and advantages of the present invention will be apparent from the following description.

DESCRIPTION OF THE PREFERRED EMBODIMENTS

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention was developed for application in the field of gas turbine engine products. However, the present invention is not intended to be limited to gas turbine engine components unless specifically provided to the contrary. While the present invention is believed applicable to a wide variety of products and components it will nonetheless be described with respect to components suitable for application in gas turbine engines.

Figure 1:
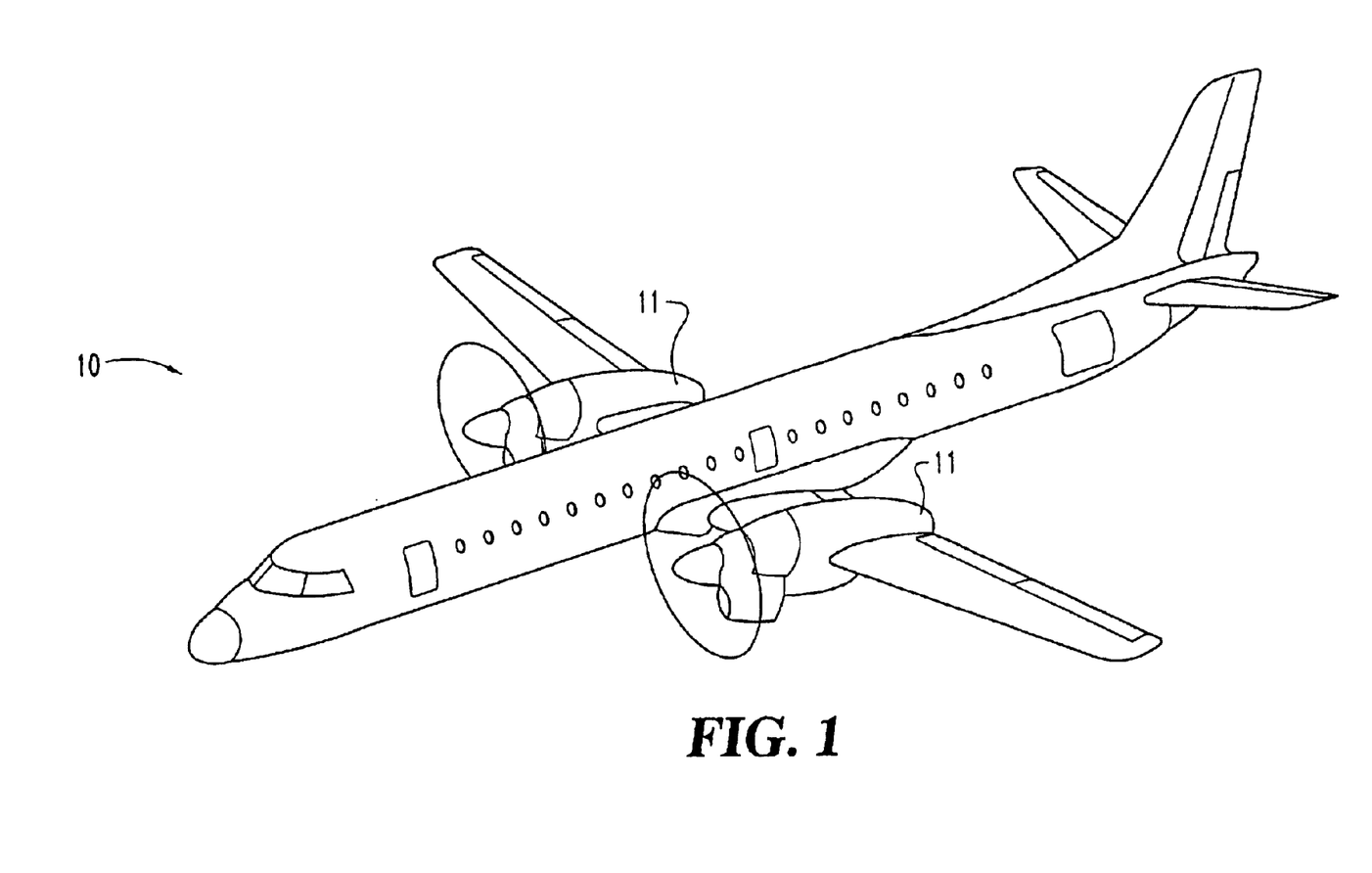
FIG. 1 is a perspective view of an aircraft having a gas turbine engine coupled thereto.
Figure 2:
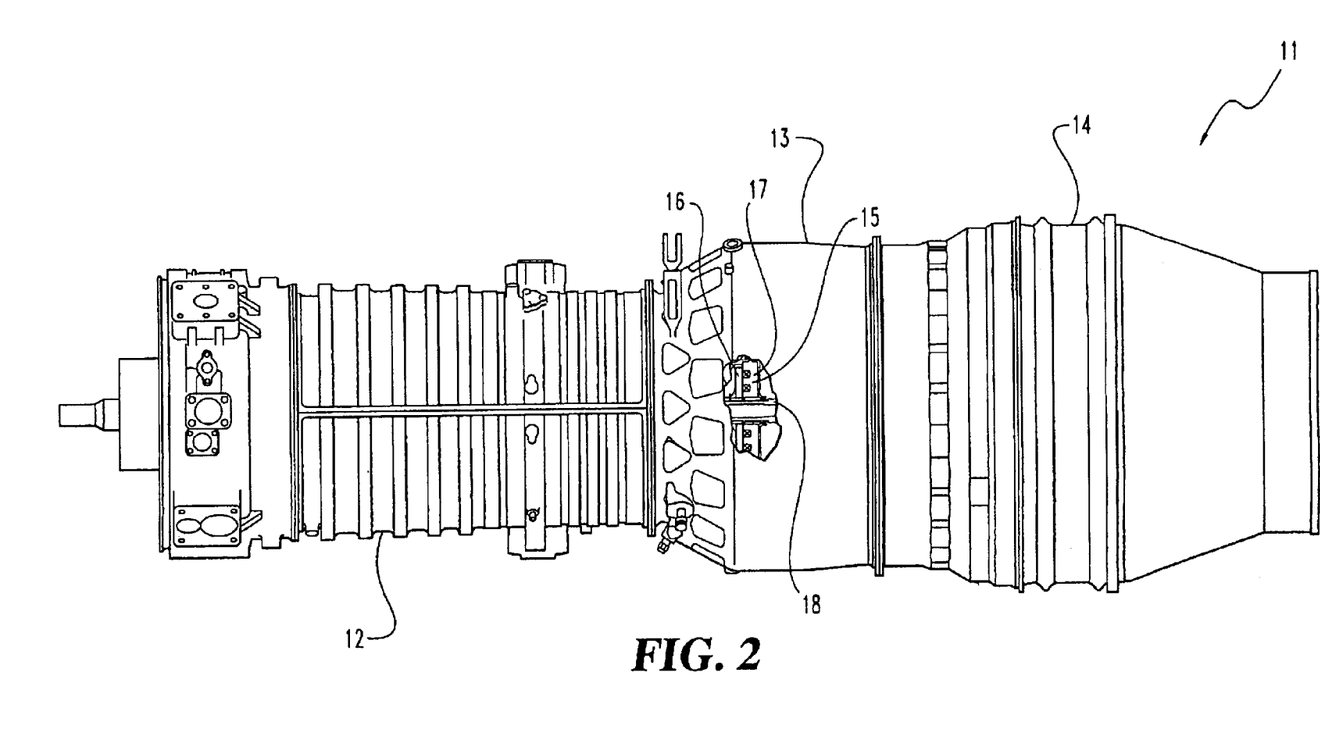
FIG. 2 is a partially fragmented side elevational view of a gas turbine engine.

With reference to FIGS. 1 and 2, there is illustrated an aircraft 10 having an aircraft flight propulsion engine 11. It is understood that an aircraft is generic and includes helicopters, tactical fighters, trainers, missiles and other related apparatus. In one embodiment, the flight propulsion engine 11 defines a gas turbine engine integrating a compressor 12, a combustor 13, and a power turbine 14. Gas turbine engines are just one form of machinery that can utilize the present invention. It is important to realize that there are a multitude of ways in which the components can be linked together. Additional compressors can be added with an inter-cooler connecting between the compressors and reheat combustion chambers can be added between the turbines. Further, gas turbine engines are equally suited to be used for industrial applications. Historically, there has been widespread application of industrial gas turbine engines such as pumping stations for gas and oil transmission lines, electricity generation, and naval propulsion.

With reference to FIG. 2, there is illustrated electromagnetic thrust bearing 15 having a thrust disk rotor 16 and a stator 17 for positioning a rotating element relative to a static structure. The thrust disk rotor 16 is an example of a structure that can utilize the present invention. However, the present invention is not limited to thrust disks and is applicable to a wide variety of components generally known to those skilled in the art. Components such as, but not limited to, flywheels, fan, compressor and turbine disks and thrust balance pistons are contemplated as ideally suited for fabrication with the present invention. One form of the present invention is particularly useful in the fabrication of ring and/or disk structures.

Figure 3:
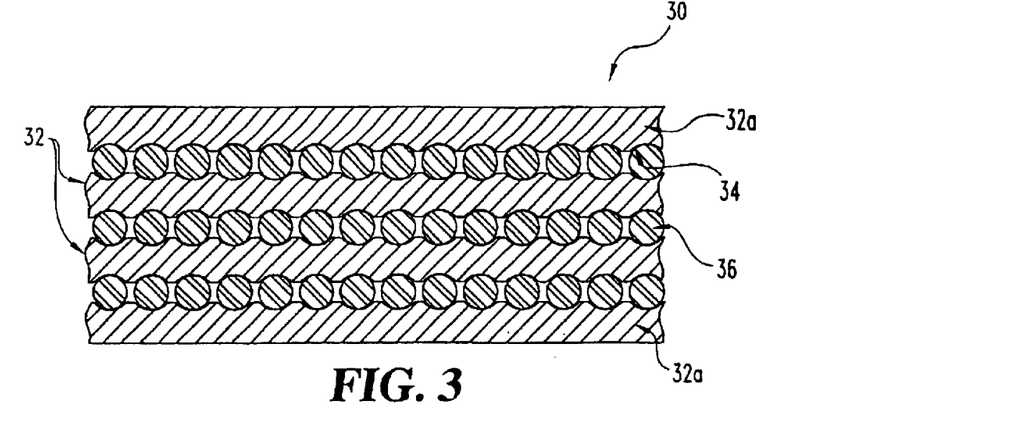
FIG. 3 is a cross-sectional view of an unconsolidated MMC configuration.
Figure 3A:
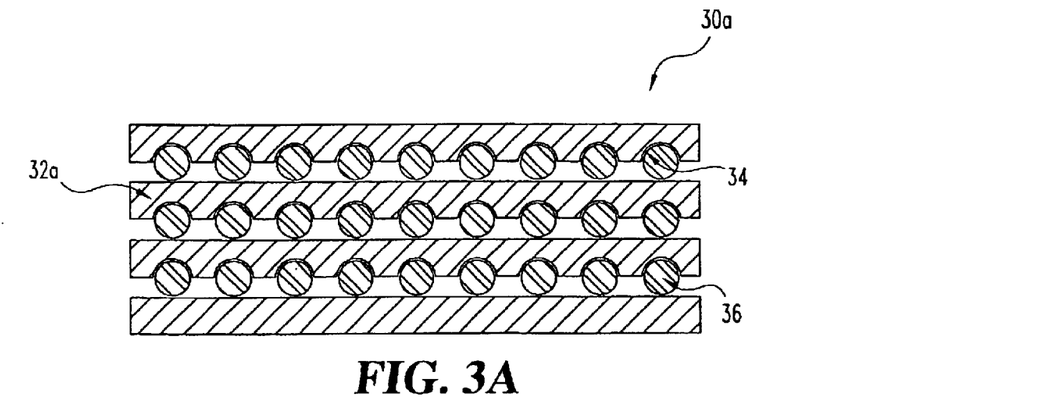
FIG. 3A is a cross-sectional view of an alternate embodiment of an unconsolidated MMC configuration.
Figure 4:
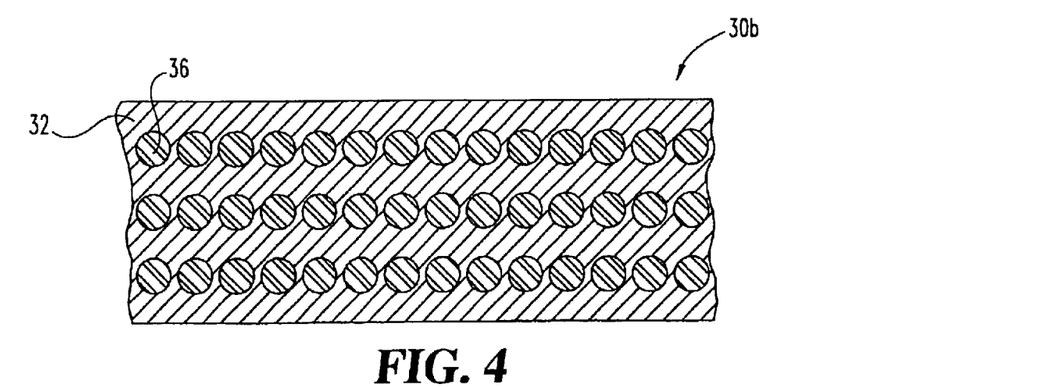
FIG. 4 is a cross-sectional view of the MMC configuration of FIG. 3 after having been consolidated into an MMC structure.

Referring now to FIG. 3, there is illustrated a schematic representation of one embodiment of an unconsolidated MMC structure 30. The MMC structure 30 includes a plurality of sheets 32 and reinforcement fibers 36. The term plurality is intended to be broadly construed and is not limited to the number of layers of material shown in the figures. In one embodiment the MMC structure includes as few as two sheets and one layer of reinforcement fiber 36. In one form of the present invention each sheet 32 has groove(s) 34 formed on both sides (FIG. 3). Further, a top and bottom sheet 32a have grooves formed on one side. However, in an alternate form the MMC structure 30a utilizes the sheets 32a having grooves only on one side (FIG. 3A). The MMC structure will be described generally with reference to sheet 32, however, it is understood that it is applicable to the other sheets described herein unless specifically provided to the contrary. The grooves 34 provide a uniform fiber to fiber spacing in the consolidated MMC structure 30b (FIG. 4). The sheet material can be selected from any of a variety of intermetallic materials, metallic materials and/or metallic alloys. Typical materials to form sheet 32 from include titanium alloys, iron-cobalt alloys and aluminum alloys. In one embodiment the sheet 32 is formed from a high temperature titanium aluminide alloy. One type of high-temperature titanium aluminide is Ti-22 Al-26Nb (orthorhombic titanium). MMC structures formed from these alloys are generally fabricated with the foil-fiber-foil method. A continuous reinforcement fiber 36 is laid within the groove 34 on each layer of the MMC structure 30. In a preferred form, the reinforcement fiber 36 is a continuous high strength monofilament having the desired mechanical properties to provide the required strength. In an alternate embodiment of the present invention multiple reinforcement fibers 36 are utilized on a single layer instead of a single continuous reinforcement fiber. The separate sheets 32 are stacked upon one another and consolidated to form an integral MMC structure 30b as shown in FIG. 4. Applying a combination of pressure and thermal cycles onto the structure 30 can form the combined structure 30b.

Figure 5:
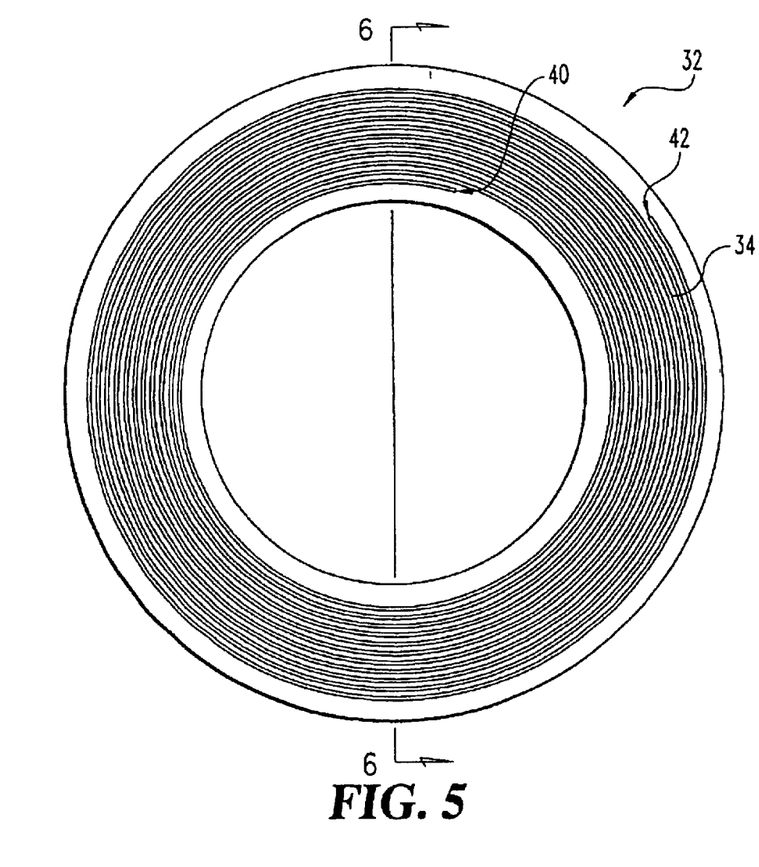
FIG. 5 illustrates a plan view of a sheet product having a continuous spiral groove formed therein.
Figure 6:
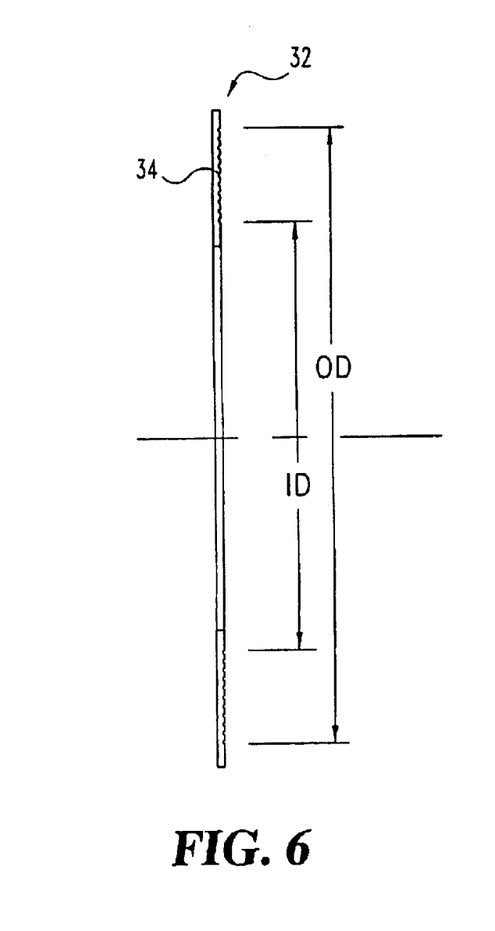
FIG. 6 illustrates a cross-sectional view of the sheet product of FIG. 5 taken along line 6—6.

With reference to FIGS. 5 and 6, there is illustrated one form of a disk 32. Referring to FIG. 5, there is illustrated a plan view of a single sheet 32 having a continuous circular shaped groove formed therein. The term circular shaped which may be utilized to define the groove is intended to be read quite broadly and will include geometrically circular, geometrically elliptical, spiral, archimedes spiral unless specifically provided to the contrary. In one form the groove will extend through at least one 360 degree revolution on the single sheet 32. It has been discovered that producing the grooves using conventional photolithographic techniques for the high temperature titanium-aluminide alloy produces unacceptable grooves. During etching, the mask tends to lift and the material under the mask is etched. This produces a sheet having a rough surface and misshaped grooves. A groove that does not have the desired geometry can cause the fiber to be misaligned, touch and/or break, which in turn can create an inferior structure.

It has been discovered that the desired groove geometry can be created by mechanically cutting the groove 34 into the sheet 32. It is also contemplated in the present invention that a plurality of continuous grooves 34 can be formed on the sheet 32. In one form, the sheet 32 has a ring shape in order to fit around a shaft such as in a turbine. However, it is also contemplated that the sheet 32 has a different configuration than shown in the drawings. Furthermore, in a preferred form, the circular continuous groove 34 has a spiral shape. The continuous groove 34 can have even spacing between the adjacent 360-degree revolutions or can have non-even spacing between the adjacent complete 360-degree revolutions. However, it is also contemplated that the circular continuous groove 34 have a different configuration than the one shown, such as a configuration with concentric circular grooves 34. It has been discovered that cutting the groove 34 with a cutting tool provides adequate groove geometry. As shown in FIG. 5, the cut can be initiated at point 40 and can end at point 42 which is located radially outward with respect to point 40. In one form of the present invention, the cutting starting point 40 and ending point 42 are controlled to provide a predetermined relationship between the start point and end point of the groove 34.

The groove pitch of groove 34 is proportional to a fiber volume fraction for a given thickness of the sheet 32. Traditionally, fiber volume fractions for ring structures 32 are typically 20–45%. However, the present invention is not limited to these volume fractions and other volume fractions are contemplated herein. The method described herein can readily accommodate this range since in one form the tool traverse speed needs only to be adjusted to change the groove pitch. In addition, to vary the stiffness of the formed ring structure 30, the groove pitch in sheet 32 can be varied from the inside diameter (ID) to the outside diameter (OD). In another embodiment the groove pitch remains constant from the inside diameter (ID) to the outside diameter (OD). A change in groove pitch is often desirable when a variation in ring stiffness of the structure 32 from the inside diameter ID to the outside diameter OD is sought. In one embodiment, a non-linear tool traverse speed is used to create the change in groove pitch.

Figure 7:
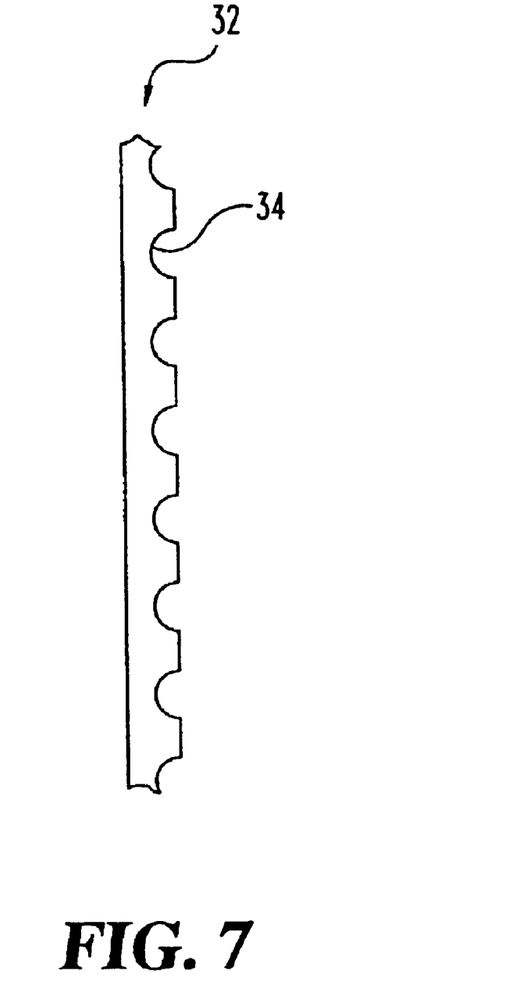
FIG. 7 illustrates a partial cross-sectional view of a grooved sheet product according to one embodiment of the present invention.
Figure 8:
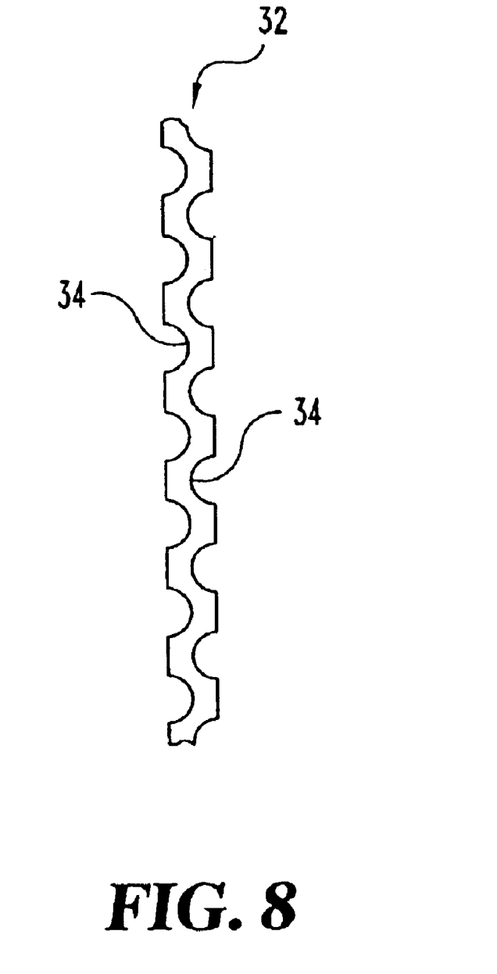
FIG. 8 illustrates a partial cross-sectional view of a grooved sheet product according to another embodiment of the present invention.

Referring now to FIG. 7, a partial cross-sectional view of the grooved sheet material 32 for one embodiment is shown. In this embodiment, the continuous groove 34 is formed on only one side of the sheet 32. In contrast, as shown in FIG. 8, in another embodiment of the present invention, continuous grooves 34 are formed on both sides of sheet 32.

Figure 9:
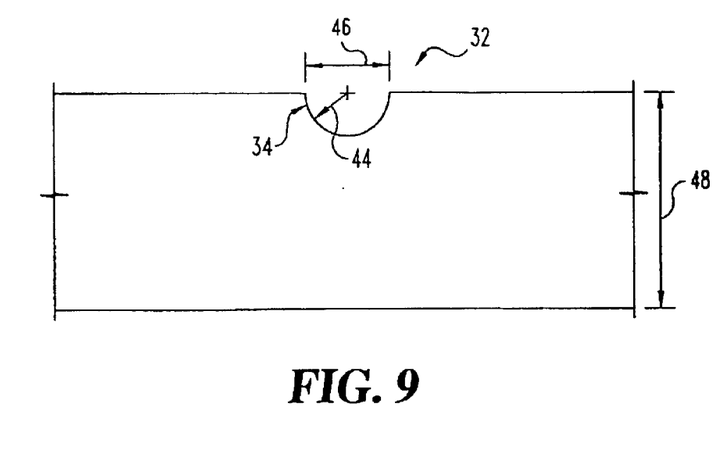
FIG. 9 illustrates an enlarged partial cross-sectional view of a groove in the sheet product material.

Referring now to FIG. 9, a partial, cross-section of one embodiment of the sheet 32 is shown. The groove 34 has a radius 44 and a width 46. The present invention is particularly applicable to cutting grooves having a width less than about 0.008 inches and a radius less than about 0.004 inches in the thin foil material. The thin foil material/sheet generally has a thickness less than about 0.010 inches. In one form of the present invention, the radius 44 is about 0.003 inches and the groove 34 has a width 46 of about 0.006 inches. The sheet 32 has a thickness 48 that is within a range of about 0.004 inches to about 0.020 inches. In a preferred form, the thickness 48 of the sheet 32 is from about 0.0045 inches to about 0.0075 inches, and in a more preferred form, the thickness 48 of the sheet 32 is about 0.007 inches. However, other sheet thickness, groove sizes and groove geometry are contemplated herein.

Figure 10:
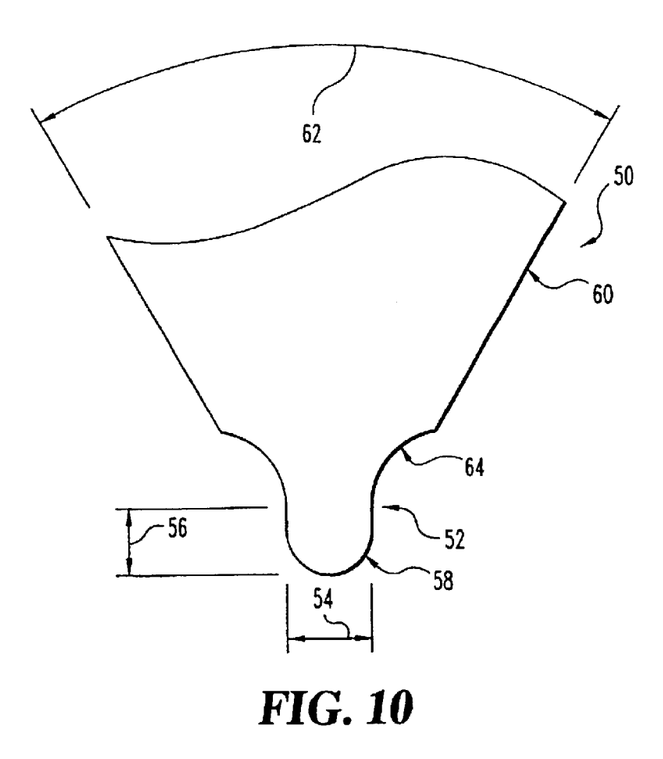
FIG. 10 illustrates one embodiment of a cutting tool utilized in cutting a groove in the sheet material.

Referring now to FIG. 10, one form of a cutting tool is illustrated. In a preferred form, the cutting tool is formed of a tool steel, a carbide cutting tool material or a ceramic metallic (cermet) cutting tool material. The cutting tool 50 includes a cutting member 52 and a body 60. As can be seen in FIG. 10, the cutting tool 50 has a single cutting member (point) 52. By having only a single cutting point 52, the cutting member 50 is adapted to cut variable groove pitches. In a preferred form, the cutting member 52 has a width 54 between about 0.0055 inches and about 0.0065 inches, a minimum length 56 of about 0.005 inches and a curvature radius from about 0.0025 inches to about 0.0035 inches. Also, in a preferred form of the present invention, the body 60 of the cutting tool 50 is formed to have an angle 62 of about sixty-degrees (60°). In addition, the cutting tool 50 can have a blend radius 64 of about 0.005 inches. However, the present invention is not limited to the specific tool and other cutting tools having other geometries, sizes, angles, etc. are contemplated herein.

Figure 10A:
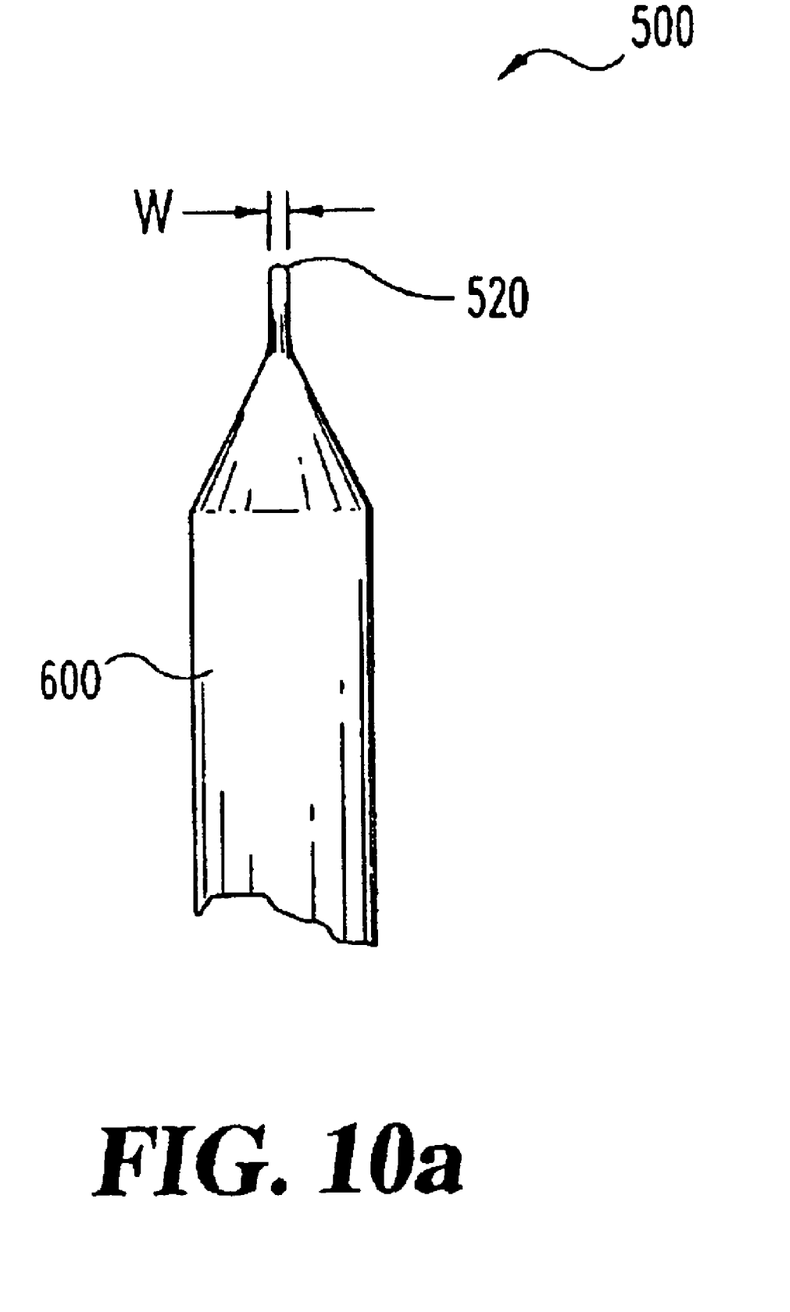
FIG. 10a illustrates another embodiment of a cutting tool utilized in cutting a groove in the sheet material.

With reference to FIG. 10a, there is illustrated another embodiment of a cutting tool 500. In a preferred form, the cutting tool 500 is formed of a tool steel, a carbide cutting material or a ceramic metallic (cermet) cutting tool material. The cutting tool 500 includes a cutting member 520 and a body 600. The cutting member 520 has a point with a radius formed thereon, and a width W. In a preferred form the width W is within the range of about 0.006 inches to about 0.008 inches. In a more preferred form the width W is about 0.008 inches. Further, the radius of the point preferably has a radius within the range of about 0.003 inches to about 0.004 inches, and more preferably is about 0.004 inches. Cutting tools having other geometry, size and properties are contemplated herein.

In order to cut the grooves, it is contemplated that the sheet 32 can remain stationary and the cutting tool 50 can move to cut the desired circular groove 34. It is also contemplated that the cutting tool 50 can remain stationary and the sheet 32 move relative to the cutting tool 50 so that the circular groove 34 can be cut into the sheet. It is also contemplated that relative movement of both the sheet 32 and the cutting tool 50 can occur so that the circular groove 34 can be formed.

Figure 11:
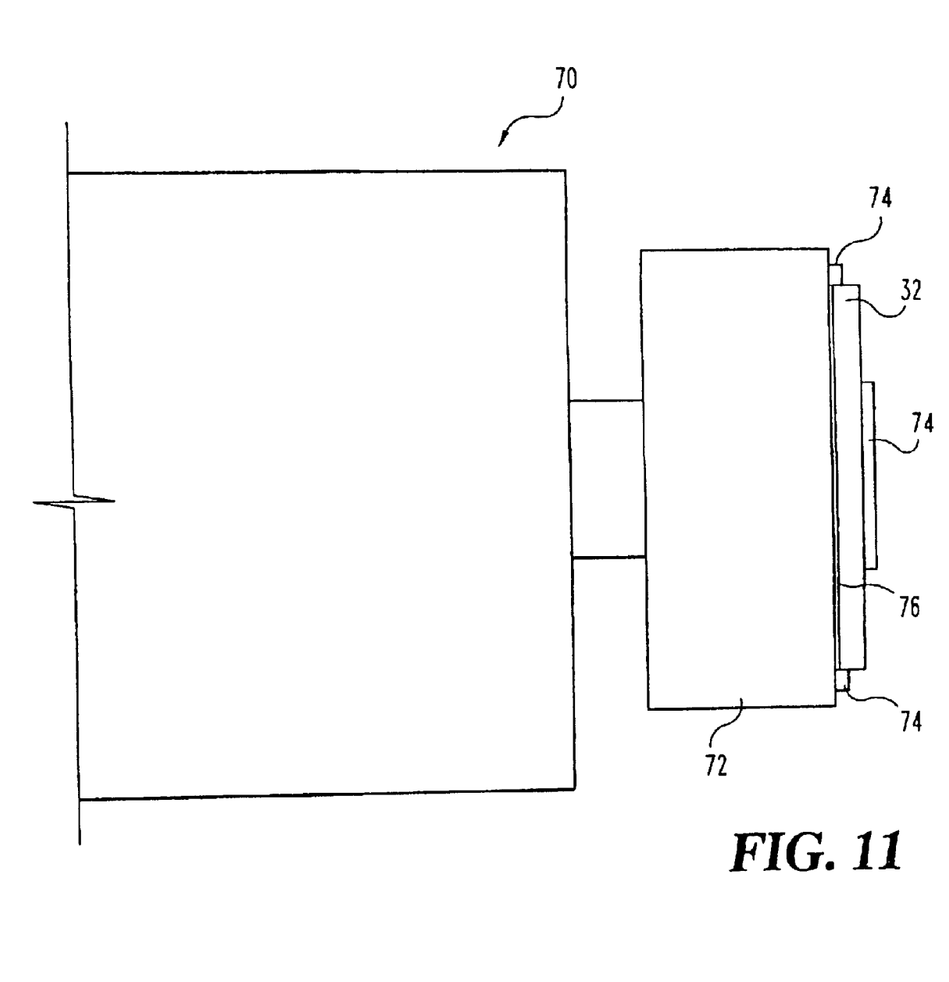
FIG. 11 illustrates an apparatus having a foil sheet coupled thereto.

A preferred form of cutting the groove 34 in the sheet 32 is shown in FIG. 11. A cutting machine 70 such as a lathe includes a securing mechanism 72 that secures the sheet during the machining process. In one embodiment the securing mechanism includes hard tooling 74 which can abut the inside diameter (ID) and the outside diameter (OD) regions of the sheet 32, and/or a magnetic chuck for magnetic alloys, and/or a vacuum chuck and/or a temporary adhesive 76 to temporarily bond the sheet 32 to the securing mechanism 72. Multiple combinations of these approaches can also be applied. The sheet 32 can be flattened either before or after the cutting of the sheet 32. In a preferred form, the flattening of the sheet 32 is accomplished by creep forming. The securing mechanism 32 in the preferred form is rotated and the cutting tool contacts the sheet 32 to begin cutting the groove 34. The cutting tool is preferably moved relative to the rotating sheet 32. The traverse speed of the cutting tool 50 can be adjusted to create the desired pitch variation of the groove 34. The cutting speed and the rake angle of the cutting tool can be adjusted to provide the desired cutting characteristics for the sheet material. In one embodiment, a cutting speed of 300 surface feet per minute produced acceptable grooves in orthorhombic titanium foil. In addition, it has been found that a neutral rake angle produces acceptable grooves in the orthorhombic titanium foil.

Figure 12:
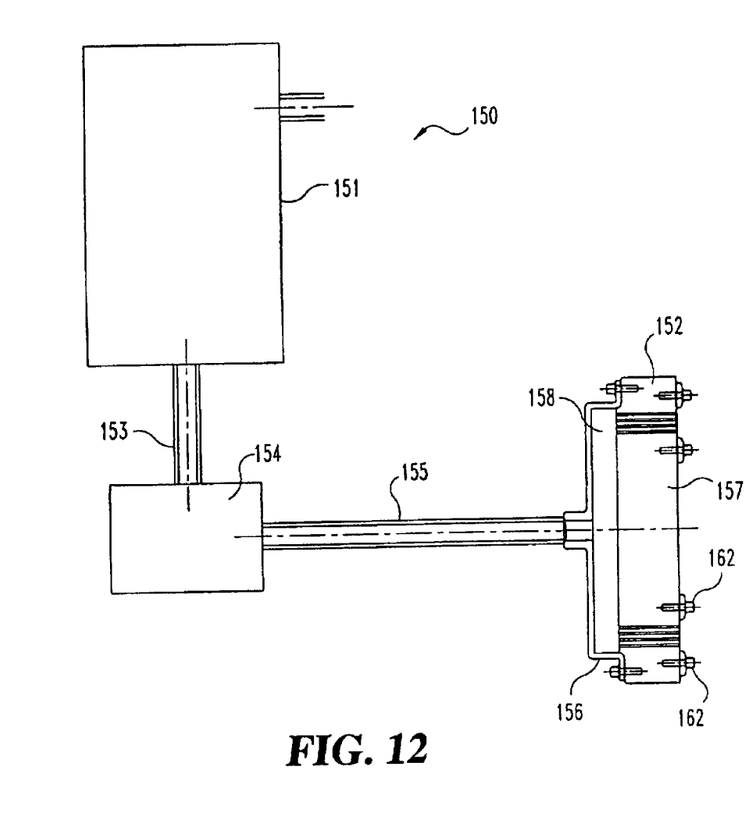
FIG. 12 illustrates a schematic representation of one embodiment of a vacuum tooling system of the present invention.
Figure 13:
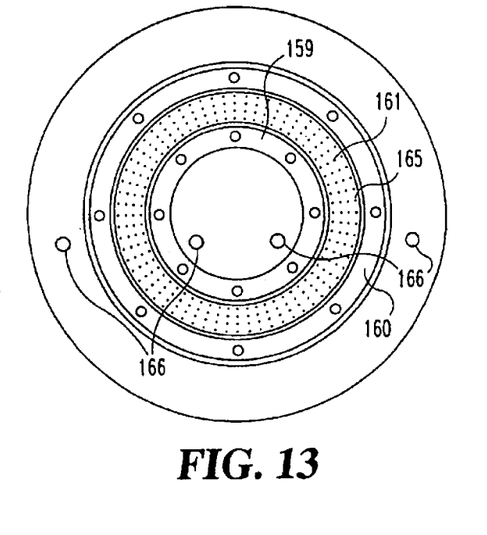
FIG. 13 illustrates an end view comprising a portion of the FIG. 12 vacuum tooling system.

With reference to FIGS. 12 and 13, there is illustrated a vacuum tooling system 150 adapted for holding the sheet material 32 during the cutting of the groove. In one embodiment the vacuum tooling system 150 includes a vacuum pump 151 operatively coupled to the vacuum chuck 152. The vacuum pump 151 is in fluid communication with the vacuum chuck 152 through a first fluid passageway 153, a rotating coupling 154 and a second passageway 155. In a preferred form the second passageway 155 is defined within a rotating structure.

The vacuum chuck 152 includes a housing 156 and a vacuum faceplate 157 which define therebetween an internal plenum 158. Removeably secured to the vacuum faceplate is an inner clamping ring 159 and an outer clamping ring 160. The rings 159 and 160 are removable to allow the positioning of the sheet material 32 on the surface 161 of the vacuum faceplate 157. The rings 159 and 160 are placed over a portion of the sheet material 32 and thereafter mechanically coupled to the vacuum faceplate 157 by a plurality of mechanical fasteners 162. The surface 161 of the vacuum faceplate 157 has a plurality of apertures 165 formed therein and disposed in fluid communication with the internal plenum 158. The vacuum from the vacuum pump draws the sheet material securely adjacent the surface 161 of the vacuum faceplate 157 during the cutting of the material. The plurality of apertures 165 preferably has a size within the range of about 0.010 inches to about 0.030 inches. In one preferred form, the plurality of apertures 165 has a size of about 0.020 inches. Preferably the size of the plurality of apertures is selected to minimize the dimpling of the thin sheet material by preventing any substantial movement of the sheet material into the aperture 165. The plurality of apertures are preferably equally spaced with an area ratio (total aperture area/sheet area) within a range of about 2%–4%. More specifically, in one form, the area ratio is about 2.7%. Further, in one form the vacuum draws up to minus one atmosphere.

With reference to FIG. 13, there is illustrated one form of tooling system 150. In one embodiment of the present invention, a plurality of alignment pins 166 extend from the vacuum face plate 157. In one form, the present invention contemplates four alignment pins, however, other quantities of alignment pins are contemplated herein. The alignment pins 166 are adapted to receive a sheet material 32 with corresponding openings formed therethrough. The alignment pins 166 and corresponding opening in the sheet material 32 function to align and orient the sheet material for cutting grooves therein. However, in another form of the present invention there are not alignment pins or corresponding openings within the sheet material.

The drawings and above text has provided details regarding many embodiments of the present invention. The following text describes these and other embodiments further. There is no intention to limit the present invention by the following description of embodiments.

1. One embodiment comprises:
   securing a sheet of high temperature titanium alloy foil on a securing mechanism; and
   cutting at least one continuous circular shaped groove on a side of the sheet with a cutting tool.
2. Another embodiment comprises the embodiment of 1 and further comprising:
   arranging at least one reinforcement fiber within the groove.
3. Another embodiment comprises the embodiment of 2 and further comprising:
   stacking a second sheet of high temperature titanium alloy foil on the sheet.
4. Another embodiment comprises the embodiment of 1 and further comprising:
   rotating the securing mechanism.
5. Another embodiment comprises the embodiment of 1 and further comprising:
   orienting the cutting tool to have a neutral rake angle with respect to the sheet.
6. Another embodiment comprises the embodiment of 1 and wherein the cutting includes moving the cutting tool so that the groove has a spiral shape.
7. Another embodiment comprises the embodiment of 1 and wherein the cutting includes varying a traverse speed of the cutting tool with respect to the sheet to vary pitch.
8. Another embodiment comprises the embodiment of 1 and wherein the cutting includes imparting a cutting speed of about 300 surface feet per minute between the sheet and the cutting tool.
9. Another embodiment comprises the embodiment of 1 and wherein the securing includes magnetically fastening the sheet.
10. Another embodiment comprises the embodiment of 4 and wherein the securing includes fastening the sheet with a vacuum and a temporary adhesive.
11. Another embodiment comprises the embodiment of 1 and wherein the high temperature titanium alloy foil includes orthorhombic titanium foil.
12. Another embodiment comprises the embodiment of 1 and further comprising:
    cutting at least one second continuous circular shaped groove with the cutting tool on an opposite side of the sheet which is opposite the side having the groove cut therein.
13. Another embodiment comprises the embodiment of 1 and further comprising:
    flattening the sheet by creep forming.
14. Another embodiment comprises the embodiment of 13 and wherein the cutting tool includes a single point ceramic tool.
15. Another embodiment comprises the embodiment of 1 and wherein a starting point of the cutting is radially inward on the sheet with respect to an ending point of said cutting.
16. Another embodiment, comprising:
    flattening a sheet of orthorhombic titanium foil by creep forming;
    securing the sheet on a securing mechanism with a vacuum and an adhesive;
    orienting a cutting tool to have a neutral rake angle with respect to the sheet, the cutting tool being a single point ceramic tool;
    rotating the securing mechanism;
    cutting at least one first continuous spiral shaped groove on a side of the sheet with the cutting tool at a cutting speed of 300 surface feet per minute, wherein a starting point of the cutting is radially inward on the sheet with respect to an ending point of said cutting;
    varying a traverse speed of the cutting tool with respect to the sheet to vary pitch;
    cutting at least one second continuous spiral shaped groove with the cutting tool on an opposite side of the sheet which is opposite the side having the first groove cut therein;
    arranging at least one reinforcement fiber within the first groove; and
    stacking a second sheet of high temperature titanium alloy foil on said sheet after said arranging.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed:

1. A method, comprising:
    providing a machine tool having a backing surface;
    positioning a sheet of orthorhombic titanium foil having a thickness less than about 0.010 inches adjacent the backing surface;
    securing the sheet of foil to the machine tool;
    cutting at least one continuous circular shaped groove in the sheet of foil with a cutting tool, the at least one continuous groove includes a plurality of spaced groove portions adjacent one another; and
    arranging at least one reinforcement fiber within the groove.

2. The method of claim 1, which further includes drawing the sheet of foil against the backing surface with a vacuum force.

3. The method of claim 2, wherein in said providing the backing surface including a plurality of spaced openings adapted for passing the vacuum force therethrough and onto the sheet of foil.

4. The method of claim 3, wherein said drawing does not pull a portion of the sheet of foil into the plurality of spaced openings and thereby substantially preventing dimpling of the foil sheet.

5. The method of claim 2, which further includes mechanically affixing the sheet of foil to the backing surface.

6. The method of claim 1, wherein said cutting including moving the cutting tool to define the groove in a spiral shape.

7. The method of claim 1, which further includes orienting the cutting tool to have a neutral rake angle with respect to the sheet of foil.

8. The method of claim 1, which further includes rotating the machine tool with the sheet of foil secured thereto and moving the cutting tool with respect to the sheet of foil.

9. The method of claim 8, wherein said rotating is at about 160 revolutions per minute and said moving is at about 1.75 in/mm.

10. The method of claim 1, wherein said cutting includes imparting a cutting speed of about 300 surface feet per minute between the sheet of foil and the cutting tool.

11. The method of claim 1, which further include flattening the sheet of foil by creep forming.

12. The method of claim 1, wherein in said cutting the cutting tool forming the groove with a width less than about 0.008 inches and a depth less than about 0.004 inches;
    which further includes drawing the sheet of foil against the backing surface with a vacuum force;
    wherein in said providing the backing surface including a plurality of spaced openings adapted for passing the vacuum force therethrough and to suck the sheet of foil against the backing surface; and
    which further includes mechanically affixing at least a portion of the sheet of foil to the backing surface.

13. The method of claim 1, which further includes stacking another sheet of foil on the sheet of foil; and
    subjecting the sheets of foil and the reinforcement fiber to a temperature and pressure cycle sufficient to consolidate and bond the sheets of foil together.

14. The method of claim 1, which further includes providing a plurality of alignment pins extending from the machine tool;
    wherein the sheet of foil includes a plurality of alignment apertures; and
    which further includes placing the plurality of alignment apertures in alignment with the plurality of alignment pins prior to said positioning.

15. The method of claim 1, wherein the at least one continuous circular shaped groove having a starting point and an ending point; and
    wherein said cutting includes forming the starting point at a first location and the ending point at a second location.

16. A method, comprising:
    providing a machine tool having a backing surface;
    positioning a sheet of orthorhombic titanium foil having a thickness less than 0.020 inches adjacent the backing surface;
    drawing the sheet of foil against the backing surface with a vacuum without dimpling the sheet of foil;
    mechanically coupling the sheet of foil to the machine tool; and
    cutting at least one continuous groove through a three hundred and sixty degree revolution in the sheet of foil with a cutting tool.

17. A method, comprising:
    positioning a sheet of orthorhombic titanium foil on a surface of a machine tool;
    holding the sheet of orthorhombic titanium foil against the surface of the machine tool with one of a vacuum and adhesive;
    mechanically securing the sheet of orthorhombic titanium foil with the surface of the machine tool;
    rotating the surface of the machine tool;
    orienting a single point cutting tool with respect to the orthorhombic titanium foil sheet; and
    cutting at least one continuous circular shaped groove on a side of the orthorhombic titanium foil sheet with the cutting tool, wherein a starting point of said cutting is radially inward on the sheet with respect to an ending point of said cutting.

18. The method of claim 17, wherein said cutting defining a continuous spiral shaped groove.

19. The method of claim 18, which further includes varying a traverse speed of the cutting tool with respect to the sheet to vary pitch between adjacent spaced portions of the groove.

20. A composite preform, comprising:
    an orthorhombic titanium alloy foil member having thickness less than about 0.010 inches and at least one continuous circular shaped groove cut therein that is consistent with the mechanical removal of material with a cutting tool, and wherein said circular shaped groove having a width less than about 0.008 inches and a depth less than about 0.004 inches; and
    a reinforcement fiber positioned within and extending along said at least one continuous shaped groove.

21. The composite preform of claim 20, wherein said at least one continuous circular shaped groove defines a spiral.

22. The composite preform of claim 20, said at least one continuous circular shaped groove defines a plurality of substantially concentric groves.

* * * * *